US008607081B2

(12) United States Patent
Peterson et al.

(10) Patent No.: US 8,607,081 B2
(45) Date of Patent: Dec. 10, 2013

(54) POWER CONTROL FOR PXI EXPRESS CONTROLLER

(75) Inventors: Keith D. Peterson, Cedar Park, TX (US); Jeffrey L. Kennedy, Austin, TX (US)

(73) Assignee: National Instruments Corporation, Austin, TX (US)

( * ) Notice: Subject to any disclaimer, the term of this patent is extended or adjusted under 35 U.S.C. 154(b) by 0 days.

(21) Appl. No.: 13/557,346

(22) Filed: Jul. 25, 2012

(65) Prior Publication Data

US 2012/0290858 A1 Nov. 15, 2012

Related U.S. Application Data

(62) Division of application No. 11/561,109, filed on Nov. 17, 2006, now Pat. No. 8,312,298.

(51) Int. Cl.
*G06F 1/26* (2006.01)
(52) U.S. Cl.
USPC ................................ 713/300; 713/1; 713/340
(58) Field of Classification Search
USPC .......... 713/1, 2, 300, 320, 322, 323, 324, 340
See application file for complete search history.

(56) References Cited

U.S. PATENT DOCUMENTS

| 4,362,954 A | 12/1982 | Cotton |
| 4,381,459 A | 4/1983 | Cotton |
| 5,305,459 A | 4/1994 | Rydel |
| 5,826,015 A | 10/1998 | Schmidt |
| 6,515,524 B1 | 2/2003 | Sterrantino et al. |
| 6,601,167 B1 | 7/2003 | Gibson et al. |
| 6,630,845 B2 | 10/2003 | Boucher |
| 6,735,142 B1 | 5/2004 | Oh |
| 7,117,377 B2 | 10/2006 | Hagiwara et al. |
| 7,120,811 B1 | 10/2006 | Bingi et al. |
| 2001/0045781 A1* | 11/2001 | Wanji ............................. 307/141 |
| 2004/0187039 A1 | 9/2004 | Yang |
| 2004/0215991 A1 | 10/2004 | McAfee et al. |
| 2005/0044449 A1* | 2/2005 | Dunstan ........................... 714/25 |
| 2005/0240832 A1* | 10/2005 | Owhadi ........................... 714/46 |
| 2007/0157033 A1* | 7/2007 | Zhang ........................... 713/300 |

* cited by examiner

*Primary Examiner* — Paul Yanchus, III
(74) *Attorney, Agent, or Firm* — Meyertons Hood Kivlin Kowert & Goetzel, P.C.; Jeffrey C. Hood

(57) ABSTRACT

A PXI Express controller may be configured to support at least three different conditions under which the controller may be turned on. If a chassis (e.g. a PXI Express chassis) interfacing with the controller has a power button, the first condition (which may be considered normal operation) may be met when the power button is being pressed at a time auxiliary power is present. When the chassis does not have a power button, the second condition may be met when the power is switched on at a time auxiliary power is present, and the third condition may be met when the power is switched on at a time auxiliary power is not present. A state-machine comprised in the PXI Express controller may be configured to interface with a chipset equally comprised in the PXI Express controller, to perform the control functions required to provide the support for the three different conditions.

13 Claims, 1 Drawing Sheet

POWER CONTROL FOR PXI EXPRESS CONTROLLER

PRIORITY CLAIM

This application is a divisional application of U.S. patent application Ser. No. 11/561,109 titled "PXI Express Controller Power Control State Machine" filed Nov. 17, 2006 now U.S. Pat. No. 8,312,298, whose inventors are Keith D. Peterson and Jeffrey L. Kennedy, and which is hereby incorporated by reference in its entirety as though fully and completely set forth herein.

BACKGROUND OF THE INVENTION

1. Field of the Invention

This invention relates generally to measurement and data acquisition systems and, more particularly, to PXI Express controller design.

2. Description of the Related Art

In meeting the demand for increased functionality coupled with reduced cost/time-to-market in instrumentation design, most instrumentation systems have begun to leverage existing, off-the-shelf technologies. The PCI Express eXtensions for Instrumentation (PXI Express)—introduced in 2005 by National Instruments—is one of several electronic instrumentation platforms in current use, and represents a modular instrumentation platform that leverages existing technology to deliver high performance and low cost modular instrumentation. PXI Express is ideally suited for building electronic test-equipment and/or automation systems, and is based on industry-standard computer buses complemented with extra features to facilitate electronic test. PXI Express affords great flexibility in building test equipment and/or automation systems to exact requirements, often fitted with custom software for managing the entire system.

PXI Express was conceived for measurement and automation applications that typically require high-performance and a rugged industrial form-factor. PXI Express also allows for module selection from a large number of vendors, with the modules easy integrating into a single PXI Express system. A typical 3U PXI Express module measures approximately 4×6 inches in size, and a typical 8-slot PXI Express rack is about the size of a small toaster oven. Overall, PXI Express uses PC-based technology as part of an industry standard governed by the PXI Systems Alliance (PXISA), ensuring standards compliance and system interoperability. PXI Express modules are available for a wide variety of test, measurement, and automation applications, from switching modules to high performance microwave vector signal generation and analysis instruments.

PXI Express modules are typically designed to implement specific functions, such as analog signal capture, RF signal analysis, and/or waveform generation. PXI Express modules that provide instrument functions usually plug into a PXI Express chassis that may include its own controller running an industry standard Operating System (e.g. Windows XP, Windows 2000, and/or Linux), or a PCI Express-to-PXI Express bridge that provides a high-speed link to a desktop PC controller. Similarly, multiple PXI Express racks may be linked together with PCI Express bridge cards to build very large systems such as multiple source microwave signal generator test stands for complex ATE applications.

Many of the PXI Express Controllers offered by National Instruments (NI) are typically turned on and off by the use of a chassis power button on the front of a PXI Express chassis. The chassis power button is generally an input signal from a mechanical momentary switch indicating that an operator of a PXI Express chassis wants to change the system on/off state. To change the system on/off state, the chassis power button will assert a signal to the controller indicating that it wants to change state. The circuitry that detects this signal is typically powered from the chassis auxiliary power. Auxiliary power refers to power that is always provided by the chassis as long as the chassis is plugged into an AC outlet. The controller will in turn use the on/off state to control the chassis on/off state. To change the chassis on/off state, a signal may be asserted indicating to the chassis that the main power supply needs to be turned on or off. The main power supply can provide the power necessary to turn on the controller.

In certain cases, however, some chassis may not be configured with a chassis power button. Chassis that do not implement a chassis power button would need to be provided with some alternate means to turn the chassis on. This may typically be accomplished through a mechanical power switch, which would be used to turn on/off the main power supplies that are comprised in the chassis. In some cases the chassis may not be configured to provide auxiliary power, requiring that the auxiliary power be connected to the main power supply. If the chassis did not provide auxiliary power, the use of a chassis power button would not be possible. Therefore the chassis would need to be turned on/off using a mechanical power switch in the same manner as previously described.

In the cases described above, the controller is typically expected to have the capability to turn on the chassis main power supply, preferably without user intervention. Another requirement may be for the chassis main power supply to remain turned off when a controller is inserted into a chassis that is plugged into an AC outlet. In other words, the controller would be expected to not turn on the main power supply. If the controller is already plugged into the chassis when the chassis is plugged into the AC outlet, the chassis main power supply may also be expected to remain turned off.

Other corresponding issues related to the prior art will become apparent to one skilled in the art after comparing such prior art with the present invention as described herein.

SUMMARY OF THE INVENTION

In one set of embodiments, a PXI Express controller may be configured to support at least three different conditions under which the controller may be turned on. If a chassis (e.g. a PXI Express chassis) interfacing with the controller has a power button, a first condition (which may be designated as normal operation) may include the power button being pressed at a time when auxiliary power is present. When the chassis does not have a power button, a second condition may include the power being switched on at a time when auxiliary power is present, and a third condition may include the power being switched on at a time when auxiliary power is not present.

As mentioned, the first condition may be considered normal behavior for most standard PC chipsets, including the chipsets used on NI PXI Express Controllers. When the power button is pressed, a power button signal may be asserted to the chipset, in response to which the chipset may instruct the system to turn on (or in other words, to boot up). A state-machine, configured to implement at least a portion of the controller functionality, may in turn switch on the main power supply, following which the system may boot up (turn on). The second and third conditions are generally not handled well by most standard PC chipsets.

For the second condition, after the power is switched on, the chipset may still be waiting for a power button to be pressed. In other words, even though power may be applied to the system, the controller may not automatically boot up as a result. Certain embodiments of the present invention provide a method to automatically assert the power button to the chipset, thereby resulting in the system booting up (turning on).

The third condition may be handled differently from the second condition. In case of the third condition, auxiliary power may be turned on at the same time the power supply is switched on to provide main power to the system. The default behavior of the chipset may be to instruct the system to turn on, since the default behavior of most chipsets is typically to turn on after a power loss, which may be defined as a loss of auxiliary power. While this may be interpreted as a correct behavior for the third condition, the same behavior may cause the PXI Express controller to turn on the main power supply when inserted in a chassis that has auxiliary power. This may occur when auxiliary power is always present on the backplane (which may be a typical configuration for some systems), and inserting the controller into the chassis may be interpreted by the system the same way as if the system was just returning from a loss of power. To prevent the controller from turning on the main power supply when the controller is inserted into the chassis, the chipset may be instructed to keep the system turned off after a power loss. This may be accomplished by programming a register in the chipset, which may, however, prevent the chipset from instructing the system to turn on when the main power supply is switched on, (as described for the second condition).

One set of embodiments of the present invention provides a method to automatically assert the power button signal to the chipset when the main power is switched on, in addition to allowing the system to turn on when the power button is pressed. In both cases the controller may be kept from turning on the main power supply when inserted into a chassis or when auxiliary power is applied with the controller having already been inserted into the chassis prior to the chassis being plugged into an AC outlet. As an added feature, the PXI Express controllers may also have the capability to instantly turn off the main power supply immediately upon the power button having been pressed.

BRIEF DESCRIPTION OF THE DRAWINGS

The foregoing, as well as other objects, features, and advantages of this invention may be more completely understood by reference to the following detailed description when read together with the accompanying drawings in which.

Figure 1:
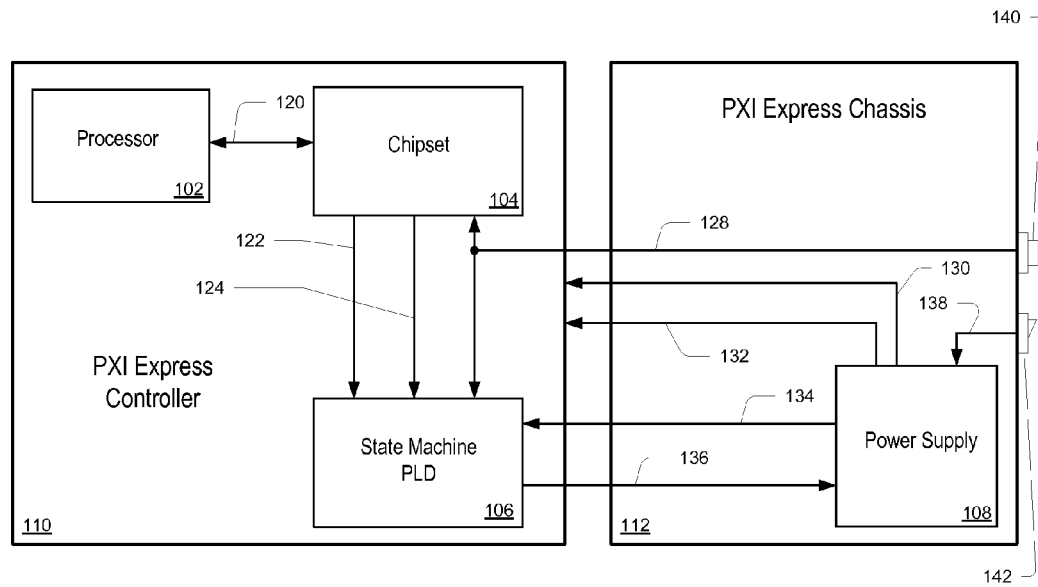
FIG. 1 is a simplified block diagram detailing the relationship between a chipset, a PXI Express Controller power control state machine, and a power supply in a PXI Express chassis, according to one embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "coupled" means "directly or indirectly connected".

DETAILED DESCRIPTION OF THE PREFERRED EMBODIMENTS

FIG. 1 is a simplified block diagram of a PXI Express controller 110 coupling to a PXI Express chassis. In one set of embodiments, a processor 102 may be coupling to chipset 104, which may be powered up/down according to the operation of a state machine 106, which may also at least partially control operation of power supply 108 configured within PXI Express chassis 112. Processor 102 may communicate with chipset 104 via one or more connections/bus lines 120. Chipset 104 and processor 102 may be a part of overall system logic, implementing at least a portion of the overall system functionality of PXI Express controller 110, while state machine 106 may be configured as control logic responsible for at least partially controlling the boot up (system turn on) functionality of PXI Express controller 110. In one set of embodiments, chipset 104 and state machine 106 may operate together to control system turn on (booting up) for PXI Express controller 110.

State machine 106 may receive an on/off signal 122 and instant off enable signal 124 from chipset 104, and both chipset 104 and state machine 106 may receive a bidirectional power button signal 128 from power button 140 configured on PXI Express chassis 112. PXI Express controller 110 may additionally receive main power 130 and auxiliary power 132 signals from power supply 108. Power supply 108 may indicate power good status to state machine 106 via power good status line 134, while state machine 106 may be configured to enable power supply 108 via power supply enable line 136. Power switch 142 may be operated to turn on power supply 108 via power switch line 138. It should be noted that PXI Express chassis 112 shown in FIG. 1 is only exemplary, and various components—which are all shown in FIG. 1—may or may not all be present in different embodiments handling different power-up conditions that are further discussed below.

In one set of embodiments, PXI Express controller 110 may support at least three different conditions under which it may be turned on, according at least to the configuration of state machine 106. If PXI Express chassis 112 has a power button 140 (as shown in FIG. 1), the first condition—considered normal operation—may be characterized by power button 140 being pressed with auxiliary power 132 present. The second and third conditions may occur in embodiments where PXI Express chassis 112 does not include power button 140, but includes power switch 142. In those cases the second condition may be characterized by main power 130 being switched on with auxiliary power 132 present, and the third condition may be characterized by main power 130 being switched on without auxiliary power 132 present.

As mentioned above, the first condition may be considered normal behavior for most standard PC chipsets, including chipset 104 used in PXI Express controller 110. When power Button 140 is pressed, asserting button signal 128, chipset 104 may respond to the asserted power button signal 128 by instructing the system via on/off signal 122 to turn on. In response, state-machine 106—which may be configured to implement at least a portion of the functionality of PXI Express controller 110—may turn on main power supply 108 via power supply enable signal 136. As previously mentioned, the first condition may apply when PXI Express chassis 112 does not include a power switch 142, and power supply 108 is plugged into a power source, e.g. an AC outlet, providing auxiliary power 132 to PXI Express controller 110 (and therefore to the system).

The second and third conditions (as previously described) are typically not handled well by most standard PC chipsets. The second condition may be characterized by auxiliary power being present at the time the power is switched on, (i.e. when power switch 142 is flipped to turn on power supply 108 via power switch signal 138). In this case, even after the power is switched on, chipset 104 may still be waiting for a power button (such as power button 140) to be pressed. In other words, while power may be applied to PXI Express chassis 112 via main power 130, PXI Express controller 110 may still not boot up. In one set of embodiments, state machine 106 may therefore be configured to automatically assert power button signal 128 to chipset 104, resulting in chipset 104 instructing state machine 106 via signal 122 to turn the system on.

The third condition may be handled differently from the second condition. The third condition may be characterized by auxiliary power not being present at the time power supply 108 is switched on, which may result in auxiliary power 132 being turned on at the same time as main power 130, when power supply 108 is switched on. The default behavior of chipset 104 may be to instruct the system to turn on, since the default behavior of most chipsets is typically to turn on after a power loss, where power loss may be defined as a loss of auxiliary power 132. While this may be interpreted as correct behavior, the same behavior may cause PXI Express controller 110 to turn on main power 130 when PXI Express controller 110 is inserted into PXI Express chassis 112 in which auxiliary power 132 is present. This may occur when auxiliary power 132 is always present on the backplane—which may be a typical configuration for auxiliary power in some systems. Under such conditions, when PXI Express controller 110 is inserted into PXI Express chassis 112, PXI Express controller 110 may effectively behave as if it were returning from a loss of power. To prevent PXI Express controller 110 from turning on main power 130 when inserted into PXI Express chassis 112 in which auxiliary power is present, chipset 104 may be instructed to remain turned off after a power loss. One way this may be accomplished is by programming a register in chipset 104. This may however prevent chipset 104 from instructing the system to turn on when main power 130 is switched on, as in the case of the second condition previously described.

Accordingly, in one set of embodiments state machine 106 may be configured to automatically assert power button signal 128 to chipset 104 when main power 130 is switched on, in addition to allowing the system to turn on when power button 140 is pressed with auxiliary power present. In both cases PXI Express controller 110 may also be configured to not turn on main power 130 when inserted into PXI Express chassis 112, or when auxiliary power 132 is applied after PXI Express controller 110 has already been inserted into PXI Express chassis 112, (for example when PXI Express controller 110 is inserted into PXI Express chassis 112 prior to PXI Express chassis 112 being plugged into an AC outlet). As an added feature, PXI Express controller 110 may also have the capability to instantly turn main power 130 off upon power button 140 being pressed when the system is turned on.

Figure 2:
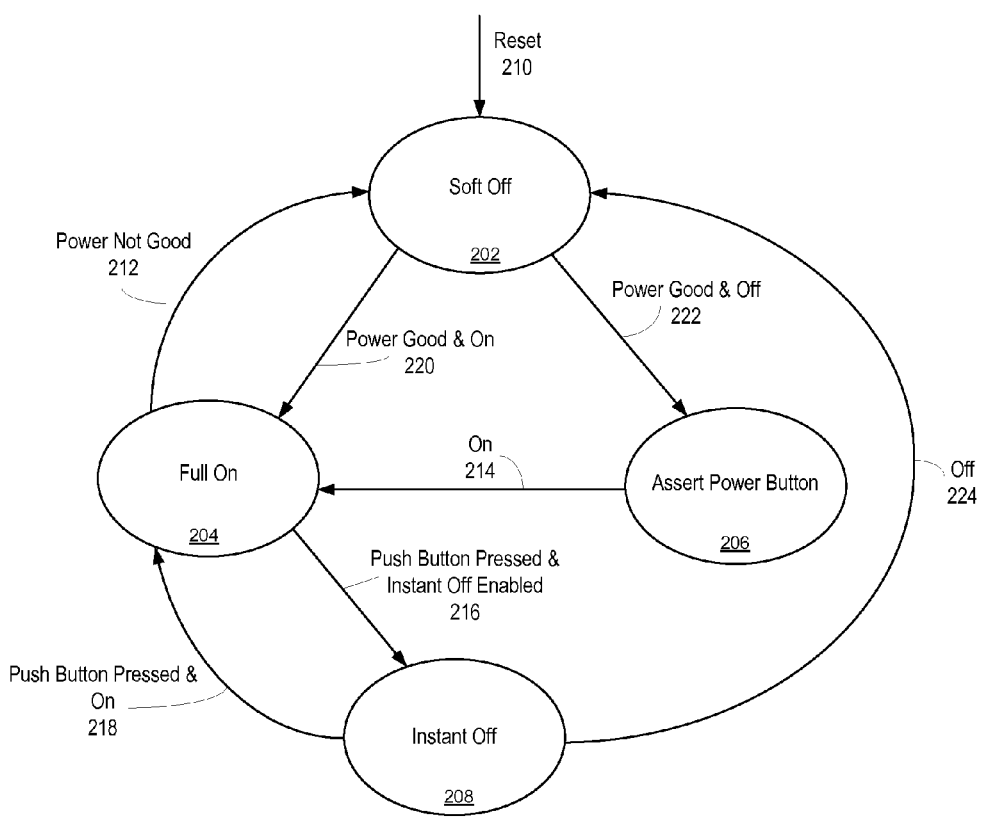
FIG. 2 is a state diagram illustrating the operation of one embodiment of the PXI Express Controller power control state machine.

FIG. 2 is a state diagram illustrating the operation of one embodiment of state machine 106 configured to support at least the three different conditions described above. The state machine may enter a Soft Off state 202 after a Reset 210 being applied. This may typically occur when the auxiliary power (for example auxiliary power 132) is within operating limits. The operating limits may be defined according to the configuration of the chipset (for example chipset 104), and are not described in detail herein. In a chassis with auxiliary power, Reset 210 may take place when the controller (for example PXI Express controller 110) is plugged-in, or when the power cord is plugged into the chassis (for example PXI Express chassis 112). In a chassis with no auxiliary power, Reset 210 may take place when the main power supply (for example power supply 108) is switched on (e.g. using switch 142 to assert switch signal 138, thereby providing main power 130). The next state following state 202 may depend on whether a power button (for example power button 140) was pressed or the power supply was switched on (e.g. using power switch 142).

In case a power button is pressed, the chipset may instruct the system to turn on, resulting in the state-machine operating to turn on the main power. The main power may thereby be turned on and assert a power good signal (for example power good signal 134) to the controller—as shown in branching condition 220—to signal to the controller that the power supply or supplies are operating properly. In response, the state-machine may then transition to Full On state 204.

In case no power button is pressed and the power supply is switched on, the power supply may assert the power good signal, but the chipset may have no way to recognize that the system needs to be turned on. In this case, the state-machine may assert the power button signal to the chipset, also indicating that power is not yet turned on—as shown in branching condition 222, resulting in the state-machine's entering the Assert Power Button state 206. Once the power button signal has been asserted to the chipset, the chipset may in response instruct the system to turn on—as shown in branching condition 214, leading to the state-machine's transitioning to the Full On state 204. The state-machine may remain in the Full On state 204 until the chipset instructs the system to turn off, or, in case instant off is enabled, until a power button is pressed.

When instant off is not enabled and the user shuts down the system from an operating system (e.g. Windows) or by pressing the power button, the chipset may instruct the system to turn off. In response, the state-machine may operate to turn off the main power. Once the main power is turned off, the power supply may de-assert its power good signal—as shown in branching condition 212, and the state-machine may transition back to the Soft Off state 202.

Instant off may be enabled in a variety of ways, for example through a BIOS setup option, effectively programming the chipset to assert a signal to the state-machine to enable instant off. With instant off enabled and the power button pressed—as shown in branching condition 216—the state-machine may transition from the Full On state 204 to the Instant Off state 208, and may operate to immediately turn off the main power. The power supply may de-assert its power good signal, in response to which the chipset may instruct the system to turn off—as shown in branching condition 224, leading to the state-machine transitioning back into the Soft Off state 202. In certain embodiments, if the power button is pressed again while in the Instant Off state 208 prior to the state machine transitioning to the Soft Off state (as per the previous description), the power supply may have its power good signal asserted, resulting in the state machine transitioning back to the Full On state according to branching condition 218.

It should be noted that while the embodiments discussed in detail center around a PXI Express controller plugging into a PXI Express chassis, other types of controllers and corresponding chassis might equally be designed and operated to support the turn-on of the controller according to the conditions described herein. For example, embodiments of state-machines operating according to the state diagram shown in FIG. 2 may be configured in controllers other than PXI Express controllers, and while such controllers are not expressly mentioned, they are possible and are contemplated. It should also be noted that while state machine 106 is shown as being separate from chipset 104, in some embodiments chipset 104 and state machine 106 may be combined as a single device, wherein the single device comprises the full functionality of chipset 104 and state machine 106.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

We claim:

1. A system comprising:
   a circuit board configured to insert into a chassis to couple the circuit board to the chassis, wherein the chassis comprises a power supply configured to provide main power and auxiliary power to the system, wherein the circuit board comprises:
   a chipset configured to at least partially implement functions performed by the system; and
   control logic coupled to the chipset via a first signal line configured to carry a first signal;
   wherein the control logic is configured to automatically assert the first signal in response to the power supply asserting a feedback signal in response to the power supply being switched on and providing main power to the system;
   wherein the chipset is configured to instruct the system to turn on in response to the first control signal being automatically asserted by the control logic; and
   wherein the control logic is configured to keep the system turned off when auxiliary power is applied to the system at a point in time when the system is turned off.

2. The system of claim 1, wherein the control logic is further coupled to the chipset via a second signal line configured to carry a second signal, wherein the second signal indicates to the control logic:
   that the chipset has instructed the system to turn on; or
   that the chipset has instructed the system to turn off.

3. The system of claim 1, wherein the chassis further comprises a power button configured to couple to the first signal line, wherein the power button is configured to assert the first signal when pressed;
   wherein the chipset is configured to instruct the system to turn on in response to the power button being pressed at a time when:
   auxiliary power is present in the system; and
   the power supply is not providing main power to the system.

4. The system of claim 3, wherein the control logic is further coupled to the chipset via a second signal line configured to carry a second signal, wherein in instructing the system to turn on, the chipset is configured to assert the second signal;
   wherein the control logic is configured to assert a third signal to the power supply to turn on the power supply, in response to the second signal being asserted.

5. The system of claim 4, wherein the control logic is configured to receive a fourth signal from the power supply, wherein the power supply is configured to assert the fourth signal to indicate that the power supply is switched on and is providing main power to the system.

6. A method for powering a system, wherein the system comprises control logic and system logic, the method comprising:
   keeping the system turned off when auxiliary power is applied to the system at a point in time when the system is turned off; and
   when the system is turned off, performing one of:
   (a) switching on a power supply to provide main power to the system; or and
   (b) pressing a power button to instruct the system logic to boot up the system;
   in response to (b):
   (c) asserting a power button signal to the system logic;
   (d) the system logic instructing the system to boot up in response to (c);
   (e) the control logic turning on the power supply in response to (d);
   (f) the power supply indicating to the control logic that the power supply is on and providing main power to the system; and
   (g) the system booting up in response to (f); and
   in response to (a):
   (h) performing (f);
   (i) the control logic asserting the power button signal to the system logic in response to (h);
   (j) the system logic instructing the system to boot up in response to (i); and
   (k) the system booting up in response to (j).

7. The method of claim 6, further comprising:
   (l) when the system is on, instructing the system logic to shut off the system;
   (m) the system logic instructing the control logic that the system logic has been instructed to shut off the system;
   (n) the control logic shutting off the power supply in response to (m); and
   (o) the system shutting off in response to (l) and (n).

8. The method of claim 6, further comprising:
   (p) enabling an instant off mode in the control logic;
   (q) when the system is on, pressing the power button;
   (r) the control logic shutting off the power supply in response to (q);
   (s) performing (o).

9. A system comprising:
   a chassis comprising a power supply configured to provide:
   main power and auxiliary power to the system; and
   a power supply status signal indicating whether the power supply is providing main power to the system; and
   a circuit board configured to be inserted into the chassis, the circuit board comprising:
   a chipset configured to control one or more system functions;
   control logic coupled to the chipset and configured to receive the power supply status signal, wherein the control logic is further configured to automatically assert a power button signal to the chipset in response to the power supply status signal indicating that the power supply is providing main power to the system when the system is off;

wherein the chipset is configured to instruct the system to turn on in response to the power button signal being asserted by the control logic.

10. The system of claim 9, wherein the chassis comprises a switch configured to switch on the power supply to provide main power to the system.

11. The system of claim 9, wherein the power supply is configured to provide auxiliary power to the system once the power supply is coupled to an external power source that provides power to the power supply.

12. The system of claim 11, wherein the control logic is configured to prevent the power supply from providing main power to the system when one or more of the following occur:

the system is off and the circuit board is inserted into the chassis at a time auxiliary power is present in the system; or the system is off and auxiliary power is provided to the system after the circuit board has been inserted into the chassis.

13. The system of claim 9, wherein the chassis further comprises a power button configured to assert the power button signal to the chipset when the power button is pressed;

wherein the chipset is configured to instruct the system to turn on in response to the power button signal being asserted by the power button when the system is off, wherein the chipset is further configured to assert a power indicator signal to the control logic, wherein the asserted power indicator signal indicates to the control logic that the chipset has instructed the system to turn on;

wherein the control logic is configured to enable the power supply to provide main power to the system in response to the asserted power indicator signal; and wherein the system is configured to boot up in response to the chipset having instructed the system to turn on and the power supply providing main power to the system.

\* \* \* \* \*